United States Patent
Hamidpour

(10) Patent No.: US 7,676,289 B2
(45) Date of Patent: Mar. 9, 2010

(54) SYSTEM AND METHOD FOR INDUSTRIAL PROCESS CONTROL

(76) Inventor: Rafie Hamidpour, 13201 Cedar, Leawood, KS (US) 66209

( * ) Notice: Subject to any disclaimer, the term of this patent is extended or adjusted under 35 U.S.C. 154(b) by 96 days.

(21) Appl. No.: 11/759,573

(22) Filed: Jun. 7, 2007

(65) Prior Publication Data

US 2007/0233288 A1  Oct. 4, 2007

Related U.S. Application Data

(63) Continuation-in-part of application No. 10/956,834, filed on Oct. 1, 2004, now abandoned.

(51) Int. Cl.
*G05B 15/00* (2006.01)
(52) U.S. Cl. .............. 700/83; 700/17; 700/19
(58) Field of Classification Search ............ 700/17, 700/19, 20, 83, 84
See application file for complete search history.

(56) References Cited

U.S. PATENT DOCUMENTS

| | | | |
|---|---|---|---|
| 4,533,992 A | 8/1985 | Magar et al. | |
| 4,539,655 A | 9/1985 | Trussell et al. | |
| 4,736,340 A * | 4/1988 | Desserrieres et al. | 700/84 |
| 5,198,809 A | 3/1993 | Day | |
| 5,255,188 A * | 10/1993 | Telepko | 601/5 |
| 5,485,620 A * | 1/1996 | Sadre et al. | 700/18 |
| 5,654,739 A | 8/1997 | Sakai et al. | |
| 5,805,064 A | 9/1998 | Yorkey | |
| 6,088,028 A | 7/2000 | Gipalo | |
| 6,495,983 B1 * | 12/2002 | Stern | 318/567 |
| 6,591,151 B1 | 7/2003 | Knopp et al. | |
| 6,775,586 B2 * | 8/2004 | Shibata et al. | 700/189 |
| 6,943,665 B2 | 9/2005 | Chornenky | |
| 7,134,372 B2 * | 11/2006 | Flaherty et al. | 83/425.4 |
| 7,283,888 B2 * | 10/2007 | Evans et al. | 318/569 |
| 2002/0021601 A1 | 2/2002 | Chornenky | |
| 2003/0091032 A1 | 5/2003 | Laxman et al. | |
| 2003/0174122 A1 | 9/2003 | Dinges et al. | |
| 2004/0019542 A1 | 1/2004 | Fuchs et al. | |
| 2004/0098138 A1 | 5/2004 | Boer et al. | |
| 2004/0098148 A1 | 5/2004 | Retlich et al. | |
| 2004/0181474 A1 | 9/2004 | Grubb et al. | |
| 2005/0155043 A1 | 7/2005 | Schulz et al. | |
| 2006/0010246 A1 | 1/2006 | Schulz et al. | |
| 2006/0074499 A1 * | 4/2006 | Hamidpour | 700/19 |

OTHER PUBLICATIONS

Notice of Allowance issued in related Canadian Patent Application Serial No. 2,521,726, dated Mar. 6, 2009, 1 page.

* cited by examiner

*Primary Examiner*—Charles R Kasenge
(74) *Attorney, Agent, or Firm*—Lathrop & Gage LLP

(57) ABSTRACT

This disclosure relates to a process control unit for controlling a process wherein the controller utilizes hardware and modular software to accomplish the control. The modular software for interfacing the process with the user allows the user to utilize predefined software interfaces with a human machine interface. A user need only define the text and parameters to be displayed and then map them to a specific element of the human machine interface therein expediting process parameter modification at a later time.

7 Claims, 12 Drawing Sheets

VALIDATION PROTOCOL
PCU SAFETY FIRST
SCREEN PRINTING PRESS

SYSTEM CONFIGURATION FOR PCU
HARDWARE CONFIGURATION FOR THE PCU
SOFTWARE CONFIGURATION FOR PCU

SAMPLE OF SOFTWARE CODE

```
RMUPC:  JSR   WDOG            ; STROB WATCH DOG TIMER
        LDA   CHDW
        STA   CHDWC            ; SET UP DWELL COUNTER
        LDA   CHIPFL           ; SET CHOP FLAG TOP BIT TO START COUNT
        ORA   #$80
        STA   CHPFL
        RMB4  PD               ; TURN ON CHOPPER
        STA   CHPFL
RMUPD:
PILOT OP CLOSES AT BEGINNING OF UPSTROKE INSTEAD OF PILOP POSITION
        LDA   RFRFL            ; GET RFR FLAG
        BNE   RMUPE            ; IF OFF, DON'T DO PIOT OP
        LDA   HPIL             ; CHECK PILOP
        BEQ   RMUPE            ; SKIP IF NO PIPOP SET
        LDA   MRFRF            ; GET MANUAL RFR FLAG
        AND   #$02             ; RF 2?
        BEQ   RMUPD1           ; NO SKIP
        LDA   HITS2            ; GET PARTS TO RF 2
        BNE   RMUPD1           ; IF NOT ZERO, DON'T CLOSE YET
        RMB3  PD               ; CLOSE ROLL FEED 2
RMUPDI: LDA   MRFRF            ; GET MANUAL RF FLAG AGAIN
        AND   #$01             ; RF 1?
        BEQ   RMUPE            ; NO SKIP
        RMB2  PD               ; CLOSE RF 1
RMUPE:  JSR   REDON            ; TURN ON RED LAMP
        RMB7 PD                ; TURN ON SOLENOID B (UP VALUE)
        LDA STATFL             ; GET STATFL
        BNE RMUPF              ; SKIP IF NOT SCREEN 0
        LDA HTONS
        LDX #0
        JSR DSPBN              ; DISPLAY PRESSURE
        LDA HRAMP
        LDX #1
        JSR DSPBN              ; DISPLAY PRESSURE
RMUPF:
        JSR WDOG               ; STROBE WATCH DOG TIMER
        JSR COUNT              ; COUNT TOT, BAT, PTS/STP ETC WHILE WAITING
        JSR TD2      ; (DELAY)
        LDA #$1
```

FIG.6

SYSTEM AND METHOD FOR INDUSTRIAL PROCESS CONTROL

CROSS REFERENCES TO RELATED APPLICATIONS

This application is a continuation in part application of commonly owned U.S. patent application Ser. No. 10/956,834, entitled: System and Method for Industrial Process Control, filed Oct. 1, 2004, now abandoned, the disclosure of which is incorporated by reference herein.

FIELD OF THE INVENTION

The present invention relates to the field of industrial process control.

BACKGROUND OF THE INVENTION

Modern process plants, designed for flexible production and to maximize recovery of energy and material, are becoming more complex. Advanced control can improve product yield; reduce energy consumption; increase capacity; improve product quality and consistency; reduce product giveaway; increase responsiveness; improve process safety and reduce environmental emissions.

By implementing advanced control substantial reductions in operating costs can be obtained. These benefits are clearly enormous and are achieved by reducing process variability, hence allowing plants to be operated to their designed capacity. Process units are tightly coupled and the failure of one unit can seriously degrade overall productivity. This situation presents significant control problems. However, it is generally acknowledged that there is currently not one technique that will solve all the control problems that can manifest in modern plants. Indeed, different plants have different requirements.

Programmable logic controllers, commonly referred to as PLCs and also known as industrial machine controllers offer one methodology for process control. Programmable logic controllers have been in use for decades and have proven reliability in harsh environments and are designed to handle many inputs and outputs which has made them the foundation of many factory automated systems.

PLCs are typically connected to industrial equipment such as assembly lines and machine tools to sequentially operate the system in accordance with a stored control program. In programmable controllers the control program is stored in a random access memory and includes sets of instructions which are executed in rapid sequence to examine the condition of selected input devices on the controlled system and instructions which energize or de-energize selected output devices on the controlled system contingent upon the status of one or more of the examined input devices. The response of the controlled system to changing conditions is directly related to the time it takes to scan the entire control program, and because the control program is executed at a fixed rate, the time necessary to cycle through it is a constraint on the complexity of the system which can be controlled by the programmable controller.

PLCs are typically well adapted to turning outputs on or off based on the state of inputs. They are also well adapted to bringing together and concentrating a lot of data and status that is uploaded into a computer in a compact form and PLCs are generally more rugged than computers.

Conversely, PLCs are not the best at handling large amounts of data, complex data, or advanced math functions.

In addition, when purchasing a PLC the objective is to purchase the input/output module that works with the PLC and that matches the actual signal/device being connected to the PLC. A PLC input/output module can also be purchased with or without a CPU and the input/output module can be utilized. PLC input/output modules are typically well designed and can be connected to a computer controller with a communications link between the computer and the PLC input/output module. This obviously requires the purchase of additional hardware which increases acquisition and implementation costs and eventually maintenance costs.

Another option available to those seeking to control industrial processes is the purchase of an industrial computer or what is commonly referred to as a Soft PLC. Industrial computers are; however, often two to three times the cost of office grade computers. In some cases, such as limited space, a user does not have an option and must use an industrial computer. The biggest drawback to industrial computers is that since they are replaced as often as office computers (typically every three years) costs are double or triple. To overcome this cost increase it is possible to use an industrial monitor, mouse, keyboard, office computer and relocate the computer to a less hazardous environment. It is possible, with additional cost, to use monitors and keyboard extenders, Ethernet, and other tricks to extend the distance between the computer and industrial environment. This obviously can create difficulties if having the controls in proximity to the process is beneficial for purposes of process troubleshooting. Regardless of whether an office or industrial computer is used it is still essential to protect the computer with surge suppression, noise filtering, vibration isolation, uninterruptible power supply, cooling etc., all of which adds additional cost and maintenance concerns.

A PLC operates with embedded firmware while a Soft PLC utilizes a commercial operating system. Soft PLCs are considered by many to be inherently unstable because they typically utilize third party software that has not been tested as part of a control system where as programmable logic controllers and distributed control systems have typically undergone extensive testing by vendors or third party consultants to validate their capabilities.

Another option for process control is a distributed control system (DCS) which utilize a mainframe to control multiple processes. A distributed control system (DCS) is part of a manufacturing system. It is generally digital, and normally consists of field instruments, connected via wiring or busses to multiplexers/demultiplexers and analog to digital and finally the human machine interface or control consoles. Distributed control systems (DCS) are used in industrial and civil engineering applications to monitor and control distributed equipment with remote human intervention. DCS is a very broad umbrella that describes solutions across a large variety of industries, including: electrical power distribution grids and generation plants, environmental control systems, traffic signals, water management systems, and refining and chemical plants. The broad architecture of a DCS solution involves either a direct connection to physical equipment such as switches, pumps and valves or connection via a secondary system such as a supervisory control and data acquisition system ("SCADA"). A DCS solution does not require operator intervention for its normal operation, but with the line between SCADA and DCS merging systems claiming to offer DCS may actually permit operator interaction via a SCADA system. The drawback to the DCS is that it is typically very expensive to install and to maintain.

It is clear from industry trends that industrial process control is a vital issue and one whose importance will only increase. Competition from not only within the U.S., but globally, is forcing manufacturers to reduce their production costs through process improvement including greater precision, faster production, less scrap and rework and reduced manual involvement in the process itself.

Presently, none of the technologies identified above provides the optimal combination of low acquisition, installation and maintenance costs and yet provides the robust capabilities of a microcontroller controlled process that is optimally positioned in close proximity to the process itself and that can readily be reprogrammed to accommodate process variations. Therefore new systems and methods are needed.

SUMMARY OF THE INVENTION

The system and method for industrial process control is a superior system and method for controlling an industrial process. A microcontroller is mounted atop a printed circuit board optimally configured to minimize the system's footprint to conserve space. The system further incorporates a plurality of inputs and outputs a compact data entry device, a data viewing device, memory and communication capabilities and modular software. The software is modular in that the low level drivers that interface the hardware to the processor are written in machine language whereas the interface between the process and the operator is written in a high level language, such as C++, to facilitate and expedite reprogramming of the controller to revised parameters or even to a totally new application.

Industrial processes are becoming more complex requiring greater precision, regular quality improvements and less waste in order for the process owner to survive in the increasingly competitive global marketplace. Few industries can survive without automating their processes and minimizing the amount of human oversight because of the increasing portion of revenue that is consumed by personnel costs. Moreover, human oversight of industrial systems generally cannot compare with the quality provided by automated systems.

Not all process control systems are created equal and each process to be controlled will have its own set of demands that must be satisfied. Systems that must be quickly reprogrammed, that require a small footprint that can be placed in close proximity to the process being controlled even in a harsh industrial environment, and systems that have robust control requirements and that require a minimum of additional hardware will all benefit from the system and method for industrial process control of the present invention.

Programmable logic controllers are many times the preferred choice for process control. Programmable logic controllers; however, frequently lack sufficient capabilities to control a robust process with sophisticated oversight requirements unless additional input/output (I/O) control hardware and feedback capabilities are purchased thereby increasing the cost of process automation. Also, maintenance costs can increase substantially whenever a programmable logic controller system malfunction occurs because not only must the controller be checked for component failures, but the supplemental I/O hardware, transducers and devices being controlled must be either thoroughly examined, thereby incurring additional maintenance and downtime costs, or quickly replaced in order to bring the production line back to full capacity, thereby drastically increasing hardware costs.

In many industrial settings, the production facility is crowded and in some cases overcrowded with equipment that is utilized to create the marketable end product. Placement of new equipment, such as a hardened programmable logic controller panel, in proximity to the process to be automated can be extremely difficult in many settings because of space constraints. Implementation of a compact system that minimizes space consumption becomes a critical determinant to automation in such applications.

The process control system of the present invention is compact and can readily be mounted in close proximity to the process being controlled and can also be mounted in a hardened enclosure to protect the componentry. The close proximity of the controller to the process being controlled gives the process operator an advantage when reprogramming process parameters. The operator can enter data using the data entry device such as a keypad and then view the data subsequent to entry to confirm its accuracy on the display device such as an LCD screen. Once the data is entered and confirmed by the operator, the production process can be initiated and viewed by the operator in close proximity to the process to witness the updated operation and confirm process operation is as desired.

The system and method for industrial process control utilizes modular software wherein the low level drivers that interface the system hardware to the processor are written in machine language. The software controlling the interface between the application itself and the user, however, is written in a higher level programming language. Additionally, the process control system will have predefined software interfaces with the display device and the data entry device also jointly referred to as the human machine interface. The predefined software interface is created with the development of a new status screen on the data display device. Display device screens are linked to predefined text and parameters that are to be displayed thereby greatly improving the functionality of the system in regards to updating process application parameters.

Process applications requiring robust closed loop control capabilities such as the ability to control servo or stepper motors will typically be unable to rely upon programmable logic controllers to accomplish the task without the addition of feedback capabilities that will increase the overall cost. A process controller relying upon a microcontroller and possessing the functionality outlined herein will be critical to the success of such an application and the system and method for industrial process control outlined herein will further improve overall production capabilities.

Another system for process control includes a controller with a processor operable to process a plurality of inputs and a plurality of outputs, an adjustment mechanism, electrically coupled to the controller, and a human-machine interface. The human-machine interface includes a data entry device and a data display device. There is also a communication connection and memory. The controller, plurality of inputs and outputs, human-machine interface and communication connection are all resident upon a single circuit board. There is also a high level programming language software module resident in the memory, for interfacing with the human-machine interface, and there is a software interface between the system hardware and the controller written in machine language. The processor is programmable to interpret at least one defined process parameter and link to an element of the human-machine interface.

BRIEF DESCRIPTION OF THE DRAWINGS

FIG. 6 is exemplary programming code in assembly machine language for controlling a production operation in accordance with an embodiment of the present invention;

DETAILED DESCRIPTION OF THE PREFERRED EMBODIMENTS

A. The Process Control System

In the following description, for purposes of explanation and not limitation, specific details are set forth, such as particular embodiments, examples, procedures, techniques, etc., in order to provide a thorough understanding of the present invention. However, it will be apparent to one skilled in the art that the present invention may be practiced in other embodiments that depart from these specific details. For example, while the present invention is described in one non-limiting embodiment as applied to a screen printing application, the present invention may be used in numerous industrial process applications. The present invention relates to a system and method for industrial process control. Such process control systems provide substantial benefit for lowering production costs by improving product quality, reducing waste, increasing production and providing production data in an easy to monitor format.

Figure 1:
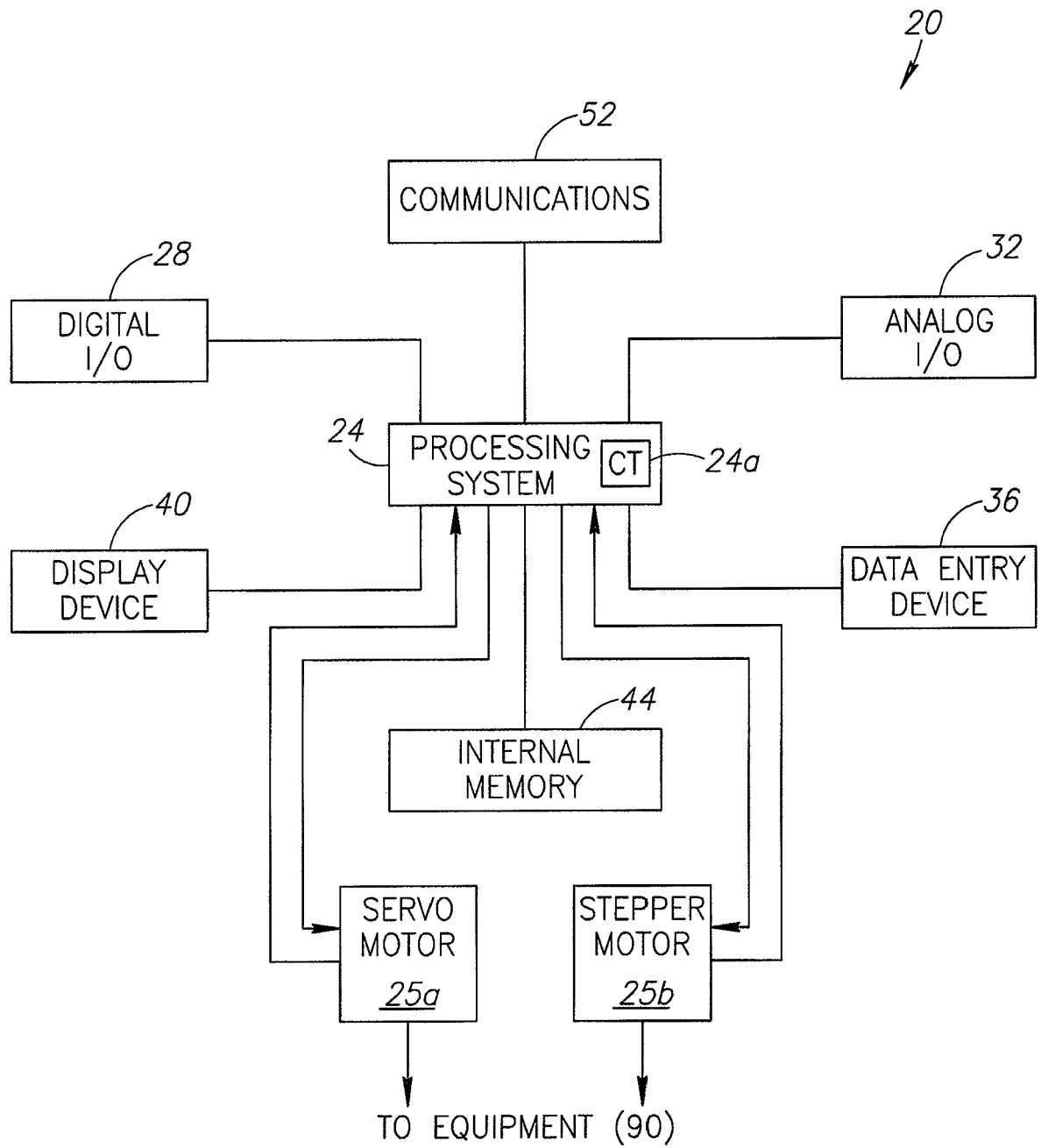
FIG. 1 is a block diagram of the system for industrial process control in accordance with an embodiment of the present invention.

Referring first to FIG. 1, one presently preferred embodiment within the scope of the present invention is illustrated and generally designated 20. Process control system 20, as illustrated, is capable of a wide range of industrial applications including, but not limited to, screen printing, die cutting, robotic material handling and extrusion machinery.

The process control system 20 has a processing system 24. A preferred embodiment of the processing system 24 would incorporate a controller (CT) 24a, for example, a Motorola model 68HC11 based controller which is optimized for low power consumption and high-performance operation at bus frequencies up to 4 MHz; however, many other commercially available microcontrollers are also capable of serving as the controller for the system 20.

The controller (CT) 24a of the processing system 24 is electrically linked to one or more adjustment mechanisms. These adjustment mechanisms include, for example, a servo motor 25a and/or a stepper motor 25b, both adapted for closed (with feedback) loop and open (without feedback) loop applications. (In FIG. 1, the processing system 24 is shown in a feedback loop with the servo motor 25a and the stepper motor 25b, as represented by the arrows between the components.) The servo motor 25a and stepper motor 25b control the various components for the various processes performed by the process control system 20. This configuration allows the processing system to change speeds continuously and without stopping, commonly referred to as "on the fly." By not stopping, batch file processing continues absent downtime, as all machines linked to the system 20, for example, the equipment 90, continue in normal operation. This also eliminates delays associated with restarting various machines and the like of the equipment 90, and thus, saves resources.

The controller (CT) 24a may be, for example, a five-axis controller. Similarly, the servo motor 25a may be a five axis servo motor. The controller (CT) 24a may also include a process control loop sensor. The loop sensor may include as input with an adjustable delay. This arrangement would, for example, support a material in place sensor, to maintain optical adjustments with respect to the X and Y axes of the sensor.

Referring again to FIG. 1, the process control system 20 incorporates digital input and output ports 28 as well as analog input and output ports 32. The number and type of these ports will vary depending upon the capabilities of the processing system 24; however, a typical configuration would include digital bidirectional ports that implement special timers and counter circuitry, a digital port configured for only output, a digital port configured only for input, a bidirectional port dedicated to serial input and output functions and an analog input port.

The utilization of the analog and digital ports depends upon the actual application being controlled by the process control system 20. Illustrative of the connectivity, but by no means limited to these components, one or more of the analog input ports may be connected to a vacuum measurement transducer with analog output such as those sold by MKS Instruments of Boulder, Colo. One or more of the digital ports may be serially interfaced to a digital pressure transducer such as those sold by Quartzdyne Corporation of Utah.

Figure 2:
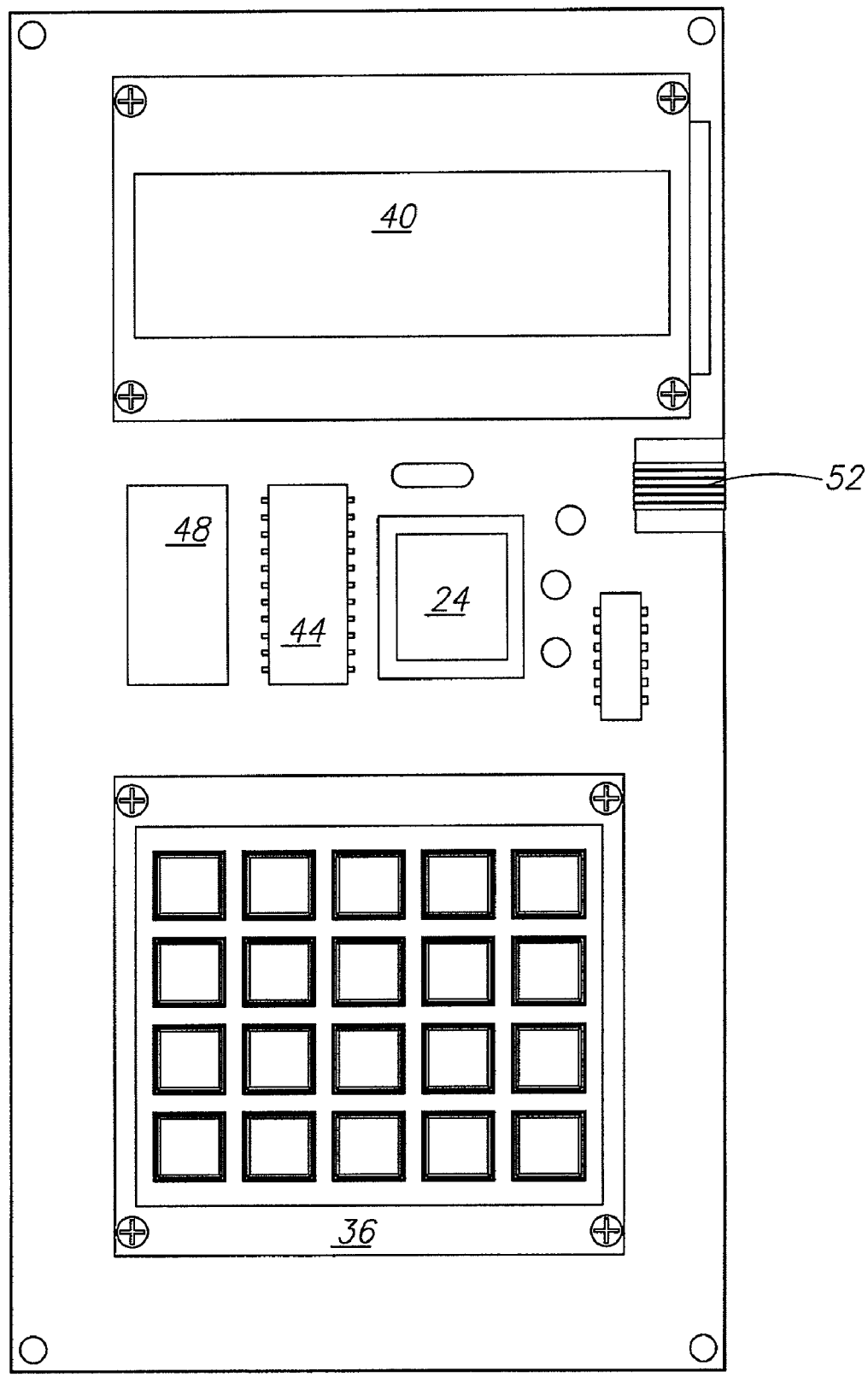
FIG. 2 is a plan view of the top side of a system for industrial process control showing the physical layout of the various components of the system in accordance with an embodiment of the present invention.

FIG. 1 further details the two components utilized as a human-machine interface. Data entry device 36 is utilized for entering data into the control system 20. In a preferred embodiment the data entry device 36 comprises a twenty-key keypad. FIG. 2 provides additional detail on a preferred embodiment of the data entry device 36 as positioned within the process control system 20. A preferred embodiment utilizes a keypad manufactured by Greyhill, Model No. 88JB2 with external dimensions no greater than 3.125 inches in width by 3.125 inches in length. It will be appreciated that many different configurations of keypads produced by various manufacturers could be employed. How the data entry device 36 is utilized to enter process control parameters and extract production data will be discussed in detail in Section B below which addresses the methods of using the process control system.

The second element of the human machine interface is a data display device 40. The process control system 20 provides an interface that allows the operator to view the entry of process parameters and to view a wide array of production data. In a preferred embodiment the data display device 40 comprises a liquid crystal display (LCD). The preferred embodiment utilizes a 16 character by four line display with an external size of approximately 3.875 inches by 2.375 inches. This display device 40 can display data under user control. A large data display device 40 can, if necessary, be utilized in order to provide a large viewing surface as the display device is elevated on mounts 75 over the other hardware mounted on the printed circuit board 80 as seen in FIG. 4.

The process control system 20 depicted in FIG. 1 utilizes internal memory 44 to store the specific process control programs that control the various applications such as screening printing, die cutting and robotic material handling. The low level drivers that interface the various hardware items including the input and output ports are written in machine language such as Assembly. The specific application software that is utilized to perform the die cutting and robotic material handling, for example, is preferably written in C++, Interactive C or Assembly language then translated and transmitted to internal memory 44, for example, an erasable programmable read only memory device (EPROM), and through the communication port 52. The process control system 20 is such that it can print a message of the C function "print f", for formatted printing on the display device 40.

Figure 3:
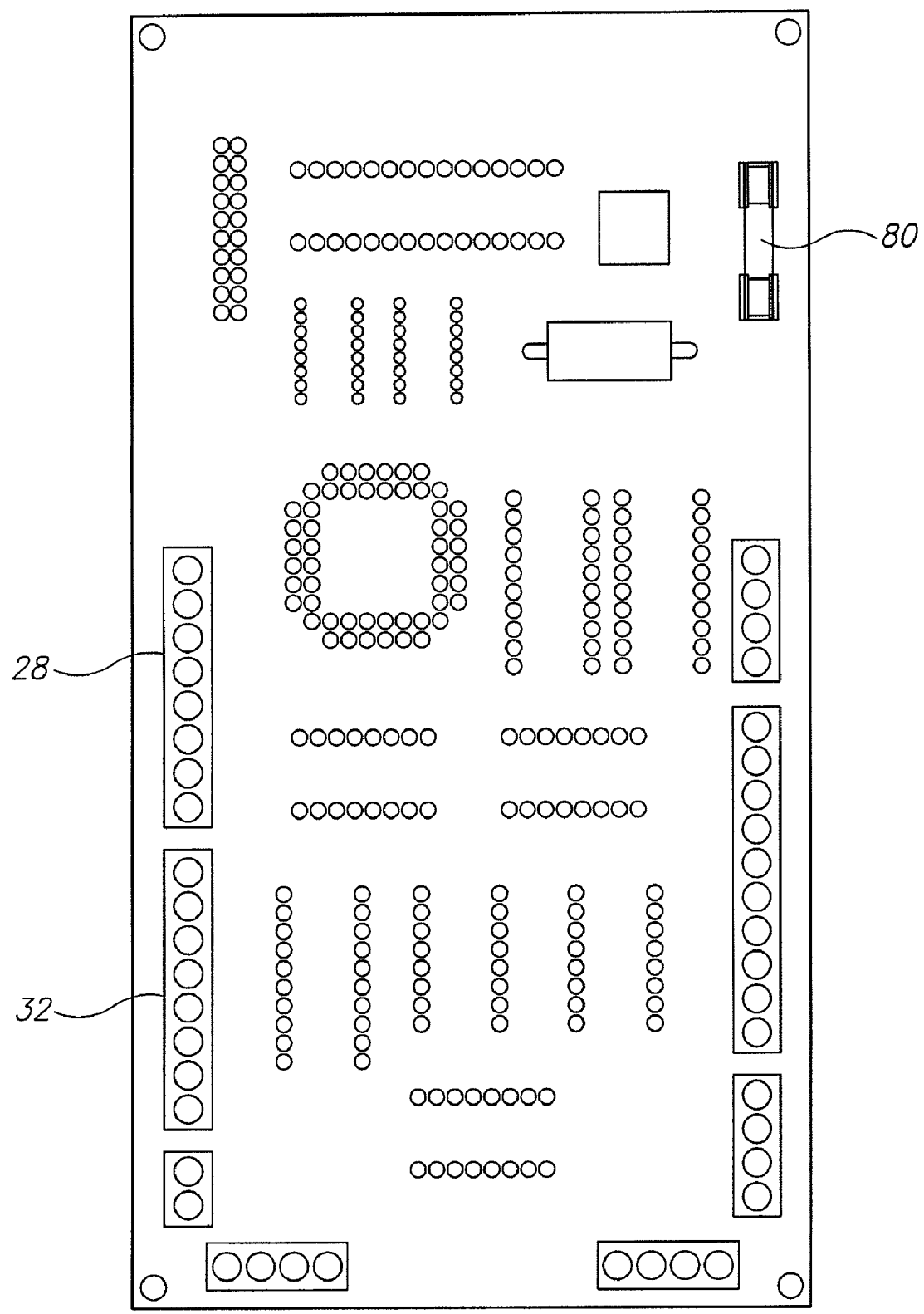
FIG. 3 is a plan view of the bottom side of a system for industrial process control showing the physical layout of the printed circuit board and various components in accordance with an embodiment of the present invention.
Figure 4:
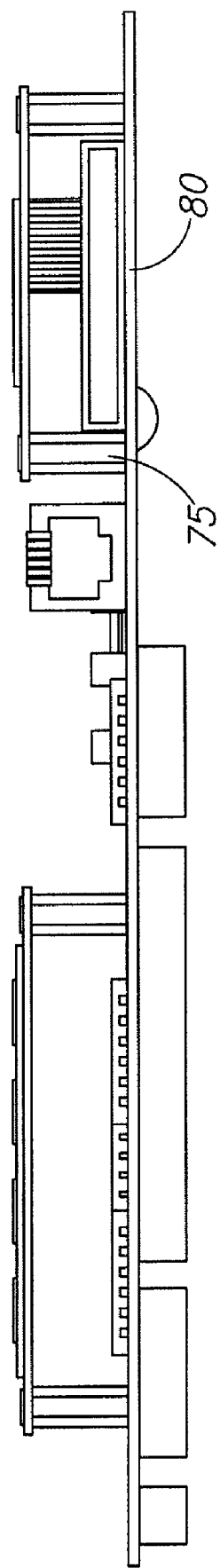
FIG. 4 is an elevation view of the side of a system for industrial process control showing the physical layout of the printed circuit board and various components in accordance with an embodiment of the present invention.

A preferred embodiment of the process control system 20 hardware is shown on a single printed circuit board 80 in FIGS. 2, 3 and 4. The processing system 24 along with the human machine interface components comprising the data display device 40 and data entry device 36 are positioned proximate the internal memory 44 and the SRAM device 48. Adjacent the memory device is the communication port 52 principally for uploading (and downloading) application programs.

When the internal memory includes an EPROM 44, it is programmed such that when files are loaded therein, the remain loaded until specifically signaled to unload the files from the processing system 24. As a result of this programming, various files can be worked or programmed while others remain in memory, avoiding the need to reload files each time a file is to be reprogrammed.

B. Methods of Using the Process Control System

Figure 5:
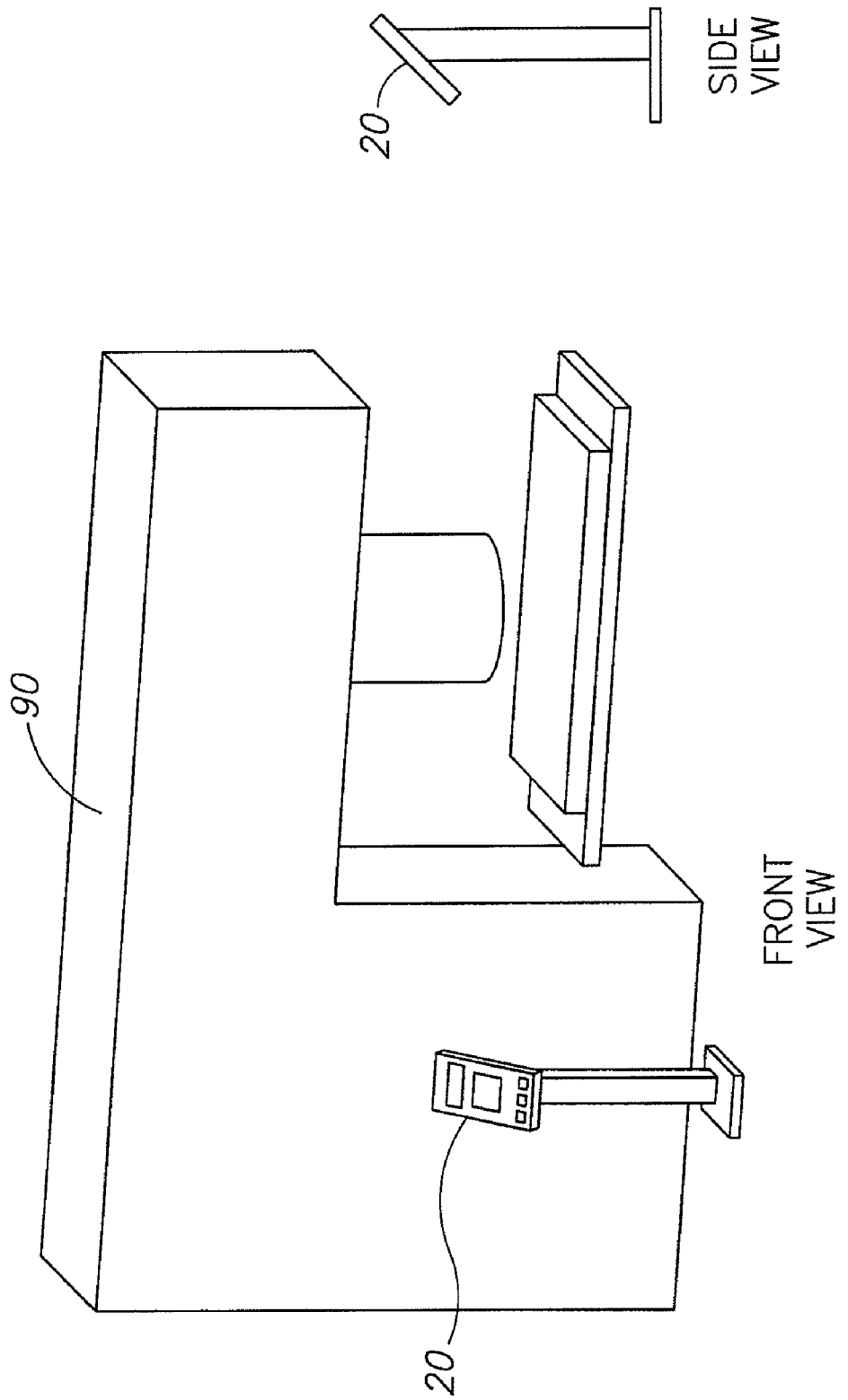
FIG. 5 is a view of the controller hardware elevated atop a support stand as configured for a factory setting in accordance with an embodiment of the present invention.

Referring now to FIG. 5, the process control system 20 is shown in an operational configuration. Under anticipated operating conditions, the process control system 20 can be placed in close proximity to the equipment 90 to be controlled or in some instances it can be affixed to the very equipment that it is controlling. Proximity to the process affords the operator an opportunity to view the results of parameter changes to the production operation. Because of the extremely compact nature of the process control system 20 and its robust control capabilities, the need for supplemental hardware such as specialized control cards or the need to reposition the equipment in order to accommodate the location of the control system is greatly diminished. Because the process control system of the present invention is exceedingly compact in its footprint it need not consume vital production floor space such as the typical 36 inch wide by 36 inch high by 12 inch deep industrial enclosure required by a traditional programmable logic controller.

The process control system 20 is preferably positioned approximately two to three feet from ground level to place the display device 40 at approximately 36 inches from the eyes of the operator and canted from the horizontal at approximately 45 degrees to maximize ergonomic viewing efficiency of the control system's display device 40.

Once the process control system 20 is connected to the various process transducers, motor drives and motion controllers, the software for the application must be developed and uploaded to the internal memory 44 of the process control system. The software for the process control system 20 is modular in design with the low level drivers that interface the hardware to the processor being written in machine language.

When an automated industrial process application is being constructed the software to control that application must also be developed. A programmer prepares the general purpose control program in machine language because of the speed with which the program language is executed by the microcontroller. An example of Assembly language text for controlling movement of a ram in a die cutting operation can be seen in FIG. 6. In the example depicted in FIG. 6, the Assembly language program requires the transducers to signal the location of the ram and based upon various parameters will raise or lower the ram as necessary to accomplish the desired task.

Once written, the Assembly language program is then translated and uploaded to the erasable programmable read only memory 44 as shown in FIG. 2. When transferred to the internal memory, for example, the EPROM 44 the program becomes resident and the process control system is ready to commence operation.

Figure 7:
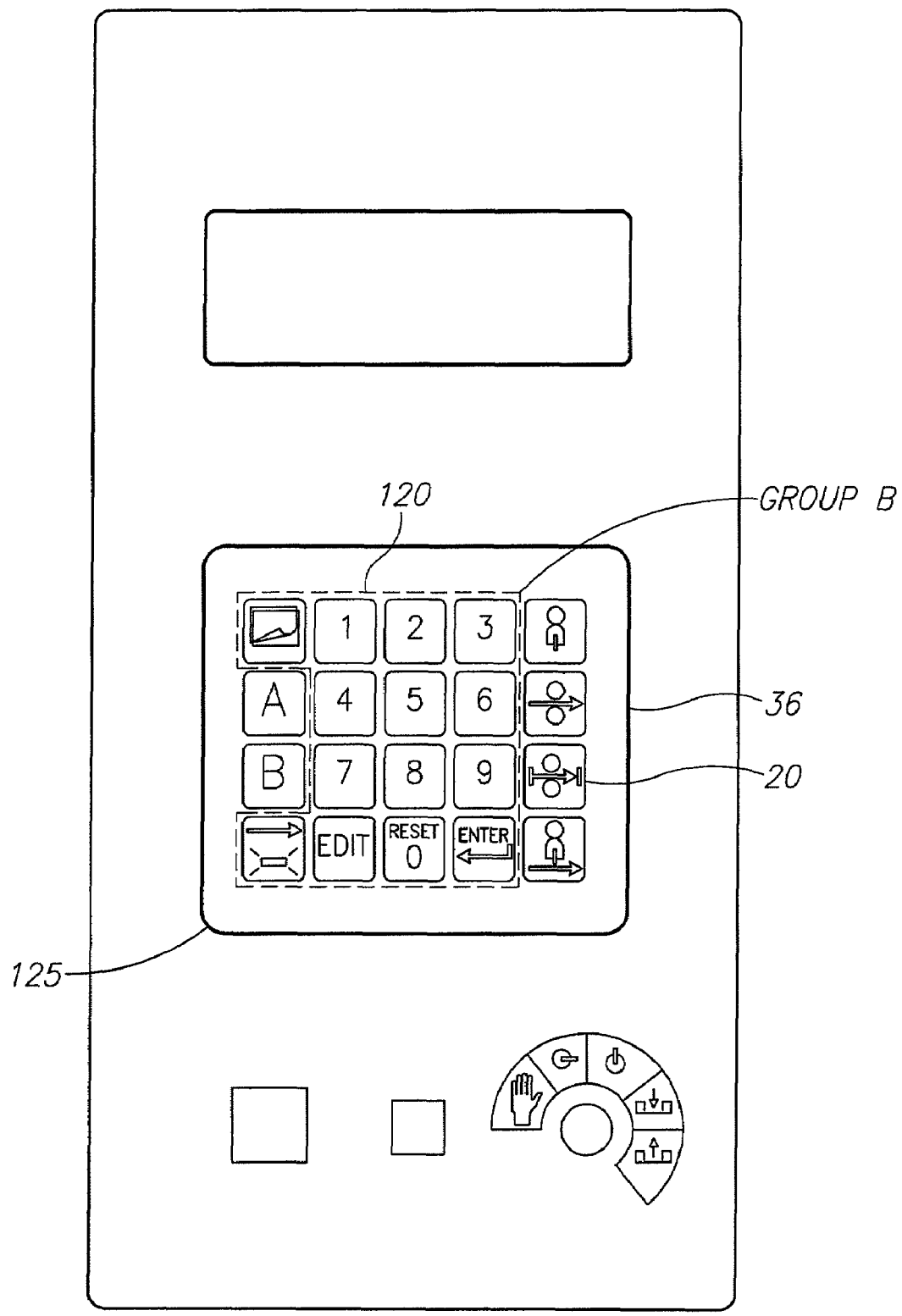
FIG. 7 is a plan view of an overlay template associated with the process control device depicting Group A keys.

As seen in FIG. 7 the human machine interface data entry device 36 utilizes data entry keys 120 along with a display overlay 125 to expand the functionality of the process control system. FIG. 7 depicts an overlay 125 embodiment directed toward a screen printing application. The twenty keys of the data entry device 36 are configured into several groups of one or more keys with each group assigned a specific functionality. The groups of keys also overlap wherein different groups will utilize many, but not all, of the same keys.

Figure 11:
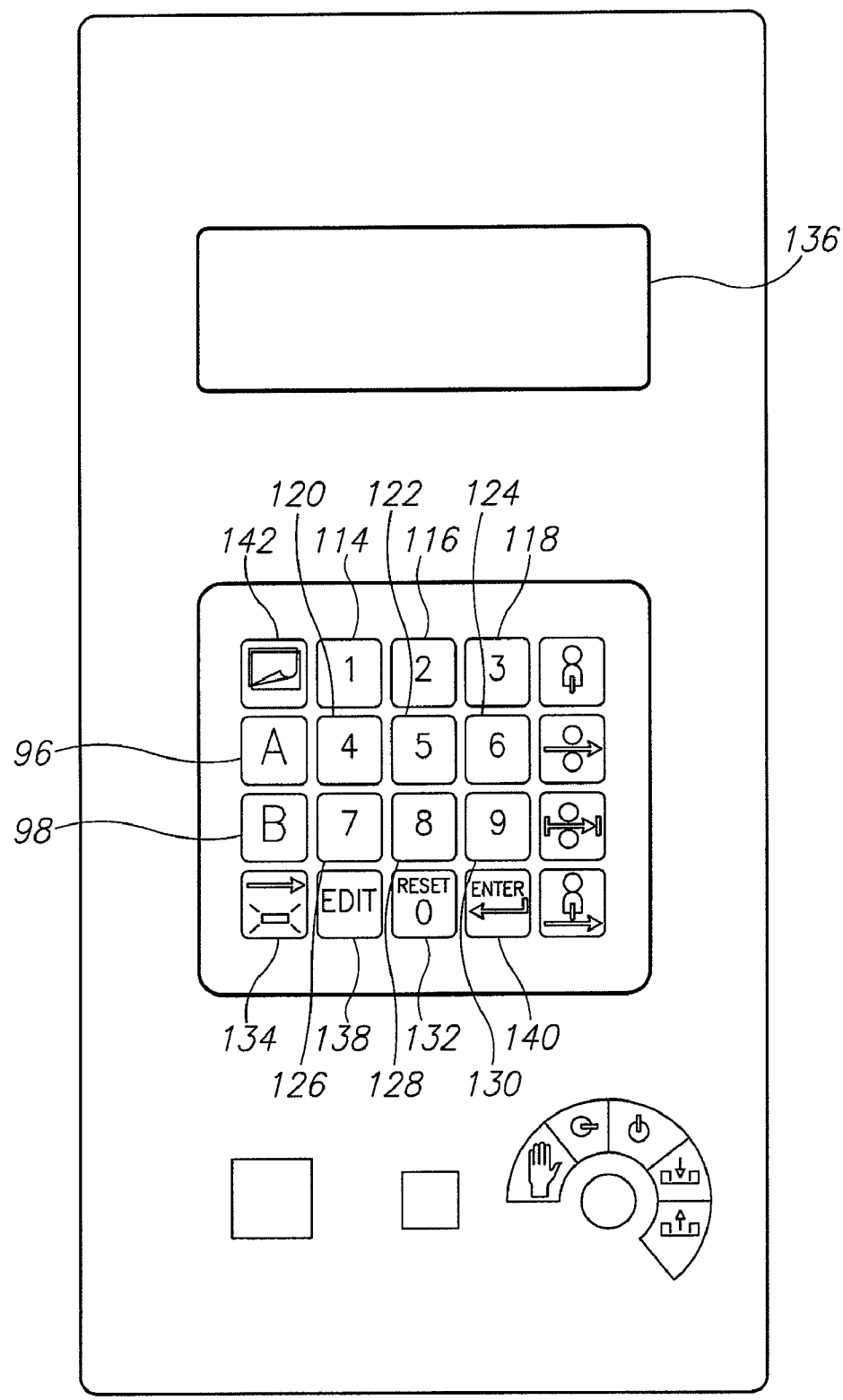
FIG. 11 is a plan view of an overlay template associated with the process control device depicting keys utilized in the screen printing application.

As seen in FIGS. 7 and 11, Group A comprises a total of 14 separate keys, keys 0-9, 114-132 the "edit" 138 and "enter" 140 keys and the keys in the leftmost column at the top and bottom 134 and 142. The function of this group is to aid the operator in changing displays, moving between fields, changing the values or status of the fields in the displays, and saving the values in the control system.

Figure 8:
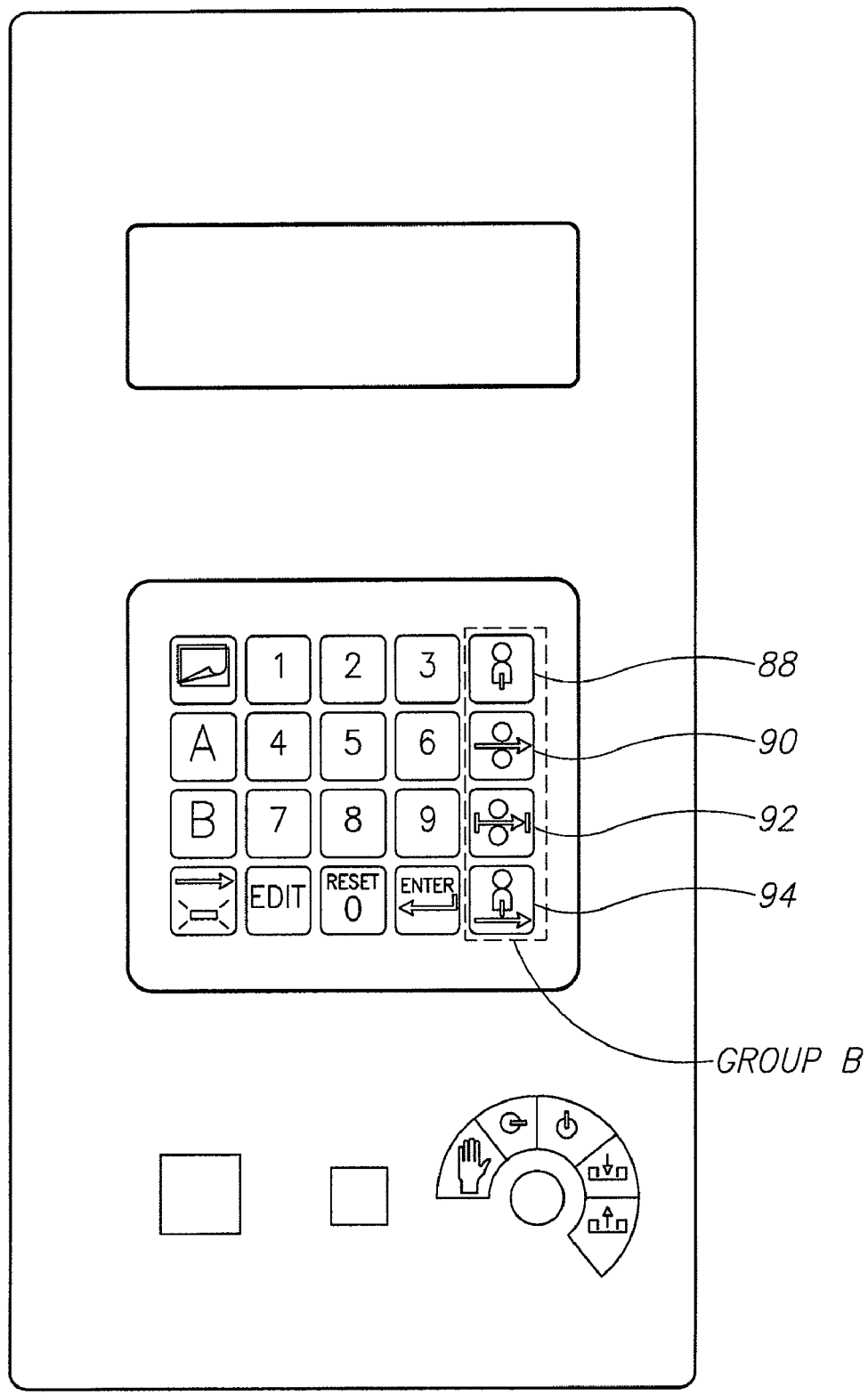
FIG. 8 is a plan view of an overlay template associated with the process control device depicting Group B keys.

As seen in FIG. 8, Group B comprises four keys. The functionality of this group of keys is to aid the operator in setting up the material for movement through the roll feeds and manually advancing materials through the press. Key 88 actuates the squeegee action in the in and out direction. The key is pressed once to open the squeegee and then again to close it. The jog key 90 when pressed and held will continuously feed the rolls and the direction of the rolls is determined by the "DIR" setting on the "ROLL FEED CYCLE" display. The index key 92 when pressed will advance the roll feeds one progression. The direction of the feed is once again determined by the "DIR" setting on the "ROLL FEED CYCLE" display. The last key of this group the step key 94 when pressed will advance the feed in one step increments each time the step key 94 is pressed. The direction of the feed is once again determined by the "DIR" setting on the "ROLL FEED CYCLE" display.

Figure 9:
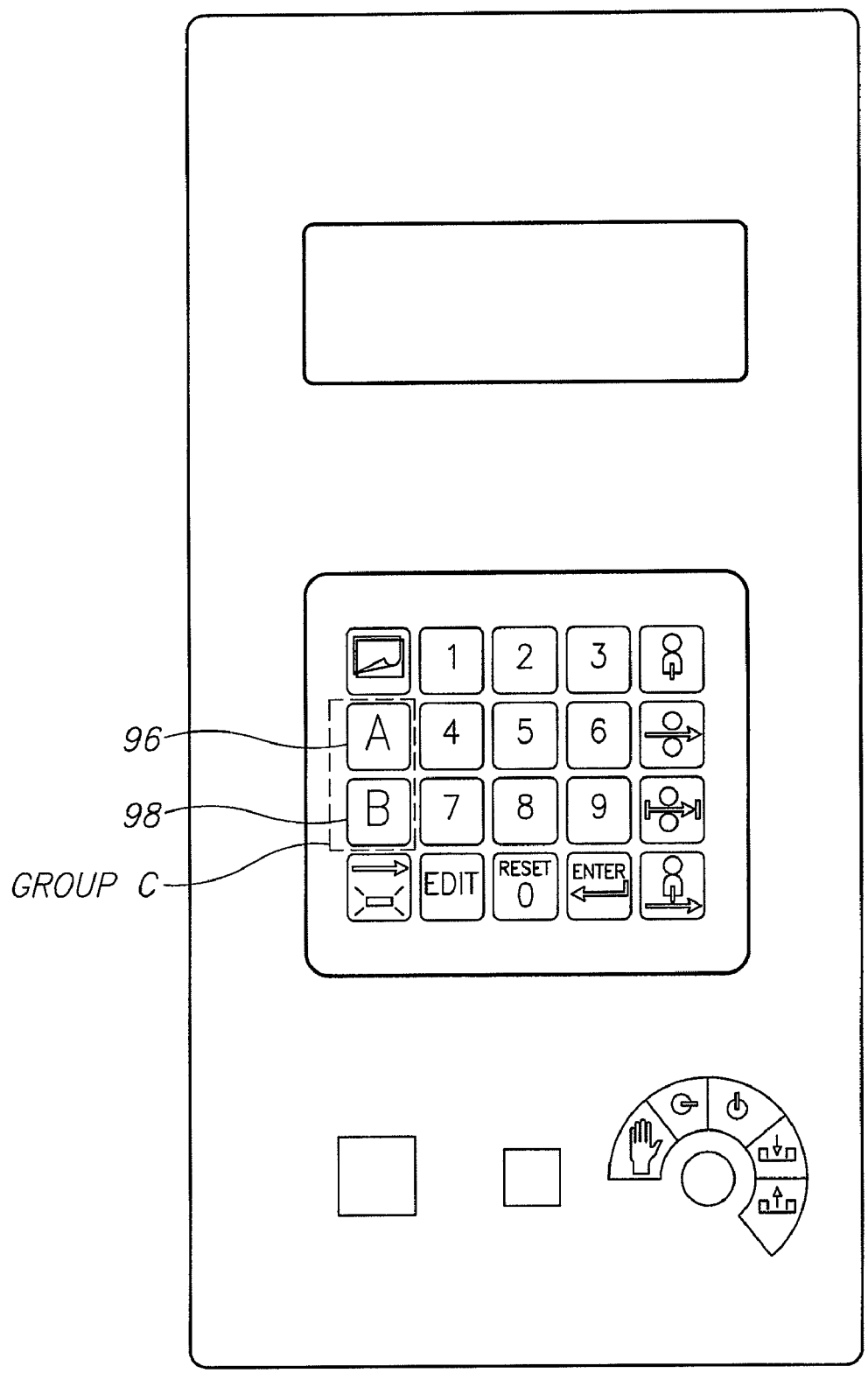
FIG. 9 is a plan view of an overlay template associated with the process control device depicting Group C keys.

As seen in FIGS. 9 and 11, Group C consists of keys A 96 and B 98. When pressed these keys select one of two special function displays which aid the operator in set-up for operation or storage of operational parameters. Key A 96 is pressed to select special function displays to select the roll feeds to be affected and to manually operate auxiliary devices. Key B 98 is pressed to display a special function display for loading, storing, deleting or listing operational parameters for different jobs.

Figure 10:
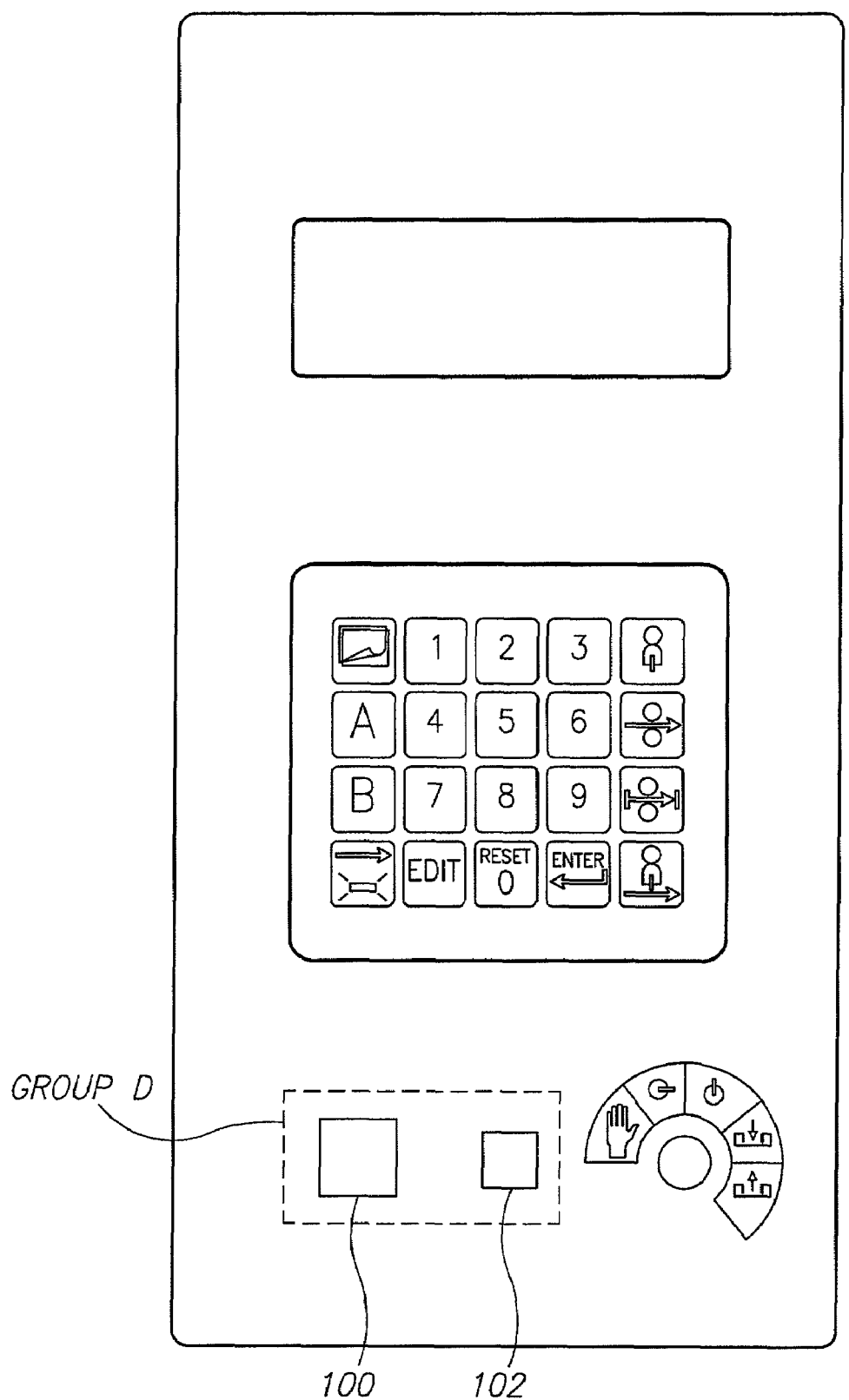
FIG. 10 is a plan view of an overlay template associated with the process control device depicting Group D keys.

As seen in FIG. 10, Group D is comprised of ready key 100 and the stop key 102. The function of these two keys is to aid the operator in starting the press in the continuous mode and stopping the operation of the system computer. Different applications will typically require some additional functionality beyond the base functionality provided by the process control system 20 and additional control features will need to be interfaced with the process hardware and software in order to provide the necessary functionality.

When the process control system commences operation the system must go through an initialization. During this time two initialization displays will be seen. The first initialization display shows company name, address and program name. When the process control system is ready for operation the second initialization display will appear.

The list below is exemplary of a standard process control system and provides a detail of keys and the displays linked to them for screen printing application.

| KEY | DISPLAY |
| --- | --- |
| 1 | STATUS |
| 2 | FEED & PRESET COUNT PARAMETERS |
| 3 | LIMITS |
| 4 | ROLL FEED CYCLE PARAMETERS |
| 5 | ADD STEPS |
| 6 | ACCESSORY SELECTION |
| 7 | PRESS SAFETY PARAMETERS & DISPLAY OPTIONS |
| 8 | UTILITY |
| 9 | OPTIC A UTILITY (OPTIONAL) |
| 10 | OPTIC B UTILITY (OPTIONAL) |
| 11 | X-optic (optional) |
| 12 | RFR select a manual operation |
| 13 | Job parameters utility |

It will be appreciated that the following is representative of numerous applications to which the process control system could be applied and that the system is not limited to this one specific example of a screen printing application. Nonetheless, this approach is instructive to detail the functionality of the system.

System Programming

To access the process control system displays sequentially, press the "SELECT" key. To go directly to the desired display, press the corresponding numeric or alpha key (The cursor must be "OFF"). As shown in FIG. 11, the valid keys in this instance are the A 110 and the B 112 and keys one through five 114-122 (6 if another input is available such as optics). Data entry has two separate functions. Entry of the basic operating data and the press function program data. The first display (STATUS DISPLAY SCREEN) relates to system status information only and does not have any operator editable fields. All other displays focus on press function programming.

When entering data and referring now to FIG. 11, the "cursor" key 134 is depressed. The blinking cursor will appear at the last digit in the first data entry field of the display device 136. The "cursor" key 134 is depressed as required to advance to the data entry field to be edited. At this point, the "EDIT" key 138 is pressed to allow the entry of numerical values. The cursor on the display device will become an underline character and data is entered into the field. The numbers will scroll from right to left, around the decimal point as they are entered. Next the "ENTER" key 140 is pressed to end data entry and save the data values into the process control system computer memory. If the field is a function status field (ON/OFF), the "EDIT" key 138 will toggle the status ("ON" to "OFF" or "OFF" to "ON") when pressed. Next, the "CURSOR" key 134 is pressed to move the cursor to the remaining data fields. To turn the cursor "OFF" the "ENTER" key is pressed twice.

Status Display—Screen 1

Screen 1, which is not depicted, displays the press system status information during operation. The fields on this display are for display only. There are no operator editable data fields. The POS field displays the actual position of the ram. The stroke field displays the distance the ram travels between its lowest pressure point or "DOWN" limit and the "UP" limit. The strokes per minute (SPM) field displays the operation speed in strokes (or cycles) per minute and is updated every 15 seconds during operation. It displays how altering "PROG," "RATE," "ACCEL," "UP" limit, and affects the cycle time.

The batch count field displays the number of strokes since power up or the last reset. When "BATCH COUNT" equals the number in BATCH PRESET," the press will pause and the process control unit will display the message "Batch Finished" during "BATCH DWELL" and the stacker operation. After "BATCH DWELL" the press operation will continue. This counter automatically resets unless the operator must restart in the middle of a batch. Press "RESET" twice to reset to zero. The total count field displays the number of strokes since power up or the last reset. When "TOTAL COUNT" equals the number in "TOTAL PRESET," the process control unit will stop and display the message, "Total Finished—Press any key . . . " This field automatically resets unless the operator must restart in the middle of a run. Press "RESET" three times to reset to zero.

Feed And Preset Count Parameters Display—Screen 2

This screen corresponds to the standard index distance (the distance between parts or cuts on the material). The feed length ranges from 000.000 to 999.999 inches (00000.00 to 99999.99 millimeters if "UNITS" equals "METRIC").

The rate represents the maximum speed the stepper motor may reach during a feed. A two digit entry that ranges from 1 (the slowest speed) to 49 (the fastest speed). 1=1000 steps per second.

Progression A is an additional feed distance most often used to begin a strip of material. It corresponds to the initial feed designed to move the strip into the starting position.

Acceleration or Ramp Rate is a single digit entry that ranges from 0 (the slowest ramp rate) to 9 (the fastest ramp rate). This is the amount of time for the motor to full speed and ramp down to a complete stop.

The batch preset function allows the operator to set up a batch counter. The programmable control unit will pause operation, when the "batch count" equals the number in the preset. To enter a new value, move the "cursor" ( ) to the proper position and press "edit." Enter up to six digit value and press "enter."

The total preset function allows the operator to set up a total production counter. The programmable control unit will halt operation, when the "TOTAL COUNT" equals the number in this preset. To enter a new value, move the "CURSOR" ( ) to the proper position and press "EDIT." Enter up to a six digit value and press "ENTER."

Limits Display—Screen 3

This display sets the "LIMITS" that are related to the ram parameters to get the best set-up and operation for the material being run through the press.

The tons field is used to set the hydraulic pressure limit at the bottom of the stroke for the press. If this pressure is reached or exceeded during the down stroke the ram will return to the "UP" limit even if it has not reached the full down position or "DOWN" limit.

The up field is used to limit the up or return stroke of the ram, during a cycle the down field to electronically limit the down stroke of the ram without pressure. The ram dwell field is used to add a delay time (0.01 to 9.99 seconds) to the bottom of the down stroke. This field may be used with heated platens or other situations where it may be desirable to delay the ram at the bottom of the stroke for a period of time. The roll feed cycle parameters display is used to set the parameters that are related to the operation of the roll feeds for the material being run through the press. DIR is used to select the direction of material travel (FWD or REV) through the rollers. To alter data, position the cursor at the proper location and press the "EDIT" key. The "DIR" will toggle from FWD to REV, or vice-versa.

PTS/STP (parts per strip) is a two digit value ranging from 00 to 99. It provides an index counter when feeding strip stock. Roll feed release cause the PROCESS CONTROL UNIT computer to automatically open the No. I roll feed at the end of "PTS/STP." This allows the operator to position the beginning of the strip in the roll feed. Use "RFR" in conjunction with the "PTS/STP" and/or the "PILOT OP" function. Also, when "RFR" is "ON" the #1 roll feed will open each time you push the "STOP" button. This has no effect on the operation of the "RFR" key.

Figure 12:
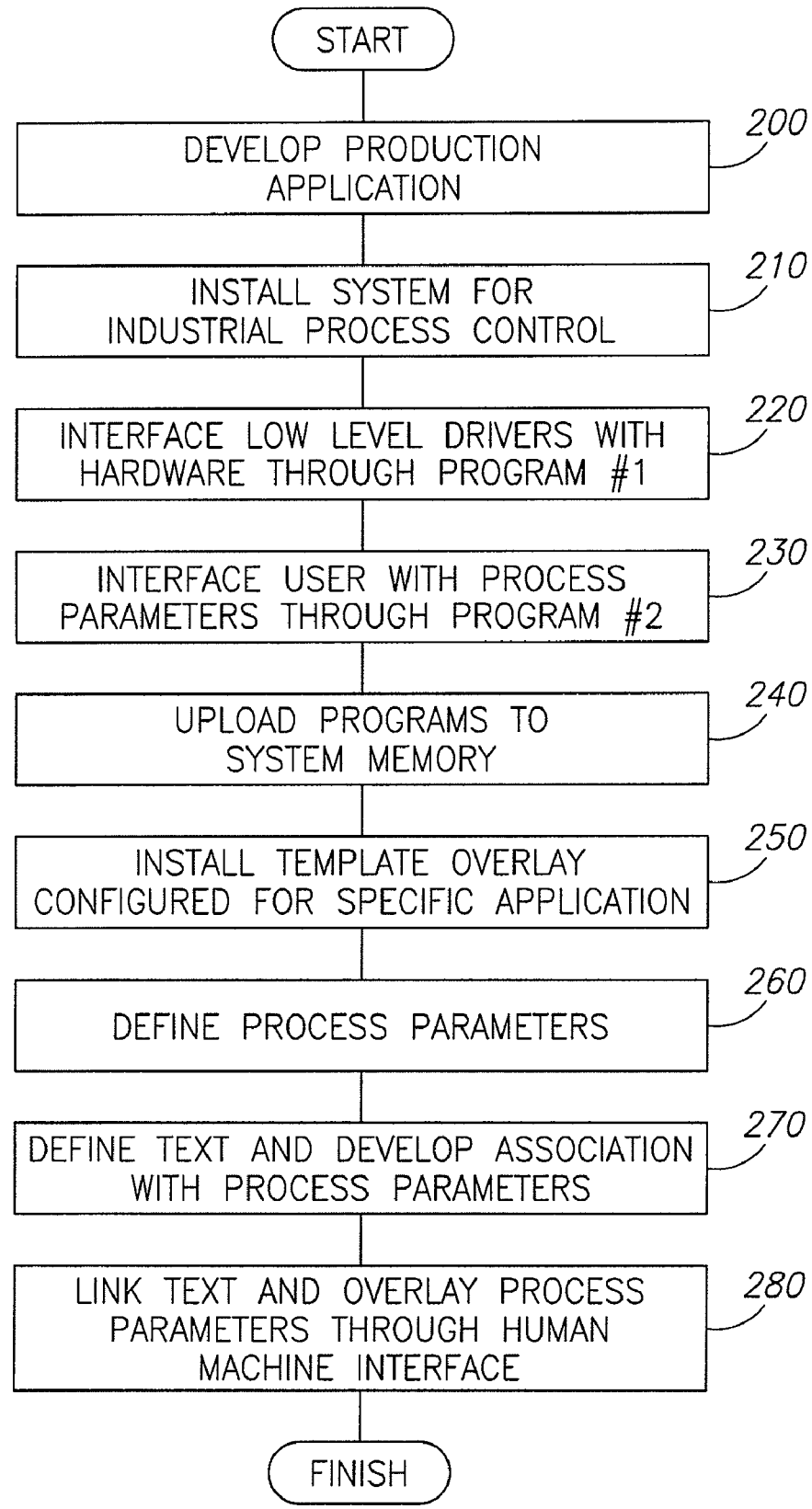
FIG. 12 is a block diagram depicting program functionality for the system for industrial process control in accordance with an embodiment of the present invention.

Referring now to FIG. 12 which depicts a block diagram of the method of using the system, the process begins with application development 200. The next step 210 requires that the process control system be installed, preferably in proximity to the system to be controlled with the system inputs and outputs appropriately configured and wired for operation. Next, the operator prepares 220 a first program to interface the low level drivers with the production system hardware. Following the preparation of the first program to interface the hardware, the operator prepares 230 a second program, preferably in a higher level programming language such as C++, that interfaces the system user with the process parameters such as speed or up and down motion as described in detail above.

As further shown in FIG. 12, following the development of the programs, the operator uploads 240 the programs to the memory on the internal memory 44. The operator then installs 250 a detachable template to the process control system 20. Numerous detachable templates can be developed for the process control system 20 in the event the application is reconfigured from, for example, a material handling operation to stamping operation. Once the template is installed, the operator must define the process parameters of interest such as system speed, or load to be applied to a component and link those parameters to defined text 260, 270. The linking of the text and the process parameters and tying them to one or more keys is accomplished by utilizing the human machine interface in a format as discussed above 280.

Using the system and method for controlling a process in accordance with the present invention, it is relatively easy to handle a wide range of process applications and to redefine process parameters utilizing the predefined software interfaces and the template overlays.

While the present invention has been described with respect to particular embodiments, those skilled in the relevant art will recognize that the present invention is not limited to those specific embodiments. Different formats, embodiments, and adaptations besides those shown and described as well as many variations, modifications, and equivalent arrangements may also be used to implement the invention. Accordingly, the invention is limited only by the scope of the claims appended hereto.

The invention claimed is:

1. A system for controlling industrial processes, the industrial processes requiring control of at least one process parameter, the system comprising:
   a controller including at least one processor operable to process a plurality of inputs and a plurality of outputs;
   at least one adjustment mechanism in electronic communication with said controller;
   a human-machine interface comprising a data entry device and a data display device, wherein the human-machine interface is operable with a plurality of detachable overlays, each of the detachable overlays being configured for a single industrial process and the detachable overlays being configured for at least two of the industrial processes of screen printing, die cutting or robotic material handling, the data entry device further including a plurality of keys configured into several groups with each group assigned a specific functionality, the specific functionality being identified by the detachable overlay and the plurality of keys being operable to define process parameters such that text may be specifically linked with the process parameters via the human-machine interface to facilitate industrial process control;
   a communication connection;
   memory;
   said controller, plurality of inputs and outputs, human-machine interface and communication connection are all resident upon a single circuit board;
   a high level programming language software module resident in said memory for interfacing with the human-machine interface;
   at least one modular software interface in electronic communication with the controller, written in machine language; and
   said processor being programmable to interpret at least one defined process parameter and link to at least one element of said human-machine interface.

2. The system of claim 1, wherein the at least one adjustment mechanism includes a servo motor.

3. The system of claim 1, wherein the at least one adjustment mechanism includes a stepper motor.

4. The system of claim 1, wherein the data display device is a liquid crystal display.

5. The system of claim 1, wherein the data entry device is a key pad.

6. The system of claim 5, wherein the at least one element of said human-machine interface includes a key on the keypad.

7. The system of claim 1, said human-machine interface is programmed to define a process parameter by assigning specific text to a predetermined process parameter.

* * * * *